US012105468B2

(12) United States Patent
Kido et al.

(10) Patent No.: US 12,105,468 B2
(45) Date of Patent: Oct. 1, 2024

(54) IMAGE FORMING APPARATUS

(71) Applicant: CANON KABUSHIKI KAISHA, Tokyo (JP)

(72) Inventors: Yasumasa Kido, Chiba (JP); Masato Yamaoka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/334,514

(22) Filed: Jun. 14, 2023

(65) Prior Publication Data

US 2024/0045369 A1 Feb. 8, 2024

(30) Foreign Application Priority Data

Aug. 3, 2022 (JP) ................................. 2022-123792

(51) Int. Cl.
*G03G 15/00* (2006.01)
*G03G 21/18* (2006.01)

(52) U.S. Cl.
CPC ... *G03G 21/186* (2013.01); *G03G 2221/1657* (2013.01)

(58) Field of Classification Search
CPC ... G03G 15/00; G03G 15/0075; G03G 21/186
USPC ................................. 399/107, 110, 111, 167
See application file for complete search history.

(56) References Cited

U.S. PATENT DOCUMENTS

2016/0265624 A1 9/2016 Sugita et al.

FOREIGN PATENT DOCUMENTS

| | | | |
|---|---|---|---|
| BR | 122015008869 | * | 3/2016 |
| JP | 2003057901 | A | 2/2003 |
| JP | 2005031447 | A | 2/2005 |
| JP | 2005274682 | A | 10/2005 |
| JP | 2017003666 | A | 1/2017 |
| JP | 2018116316 | A | 7/2018 |

OTHER PUBLICATIONS

Extended European search report issued in European Appln. No. 23180005.3 mailed on Oct. 24, 2023.

* cited by examiner

*Primary Examiner* — Hoan H Tran
(74) *Attorney, Agent, or Firm* — ROSSI, KIMMS & McDOWELL LLP

(57) ABSTRACT

An image forming apparatus includes a driving unit configured to apply a driving force to a photosensitive drum, in which the driving unit includes a first driving frame hold a shaft joint side of a driving gear, a second driving frame hold a side opposite to the shaft joint side of the driving gear and be located coaxially with the first through-hole, a first driving frame wall portion extend in an axial direction of the driving gear toward the second driving frame, and a second driving frame wall portion extend in the axial direction toward the first driving frame, and an elastic member is compressed and held in a gap between the first driving frame wall portion and the second driving frame wall portion.

14 Claims, 15 Drawing Sheets

IMAGE FORMING APPARATUS

BACKGROUND OF THE INVENTION

Field of the Invention

The present invention relates to an image forming apparatus including a driving unit that applies a driving force to a rotating member.

Description of the Related Art

In recent years, there has come to be a strong demand for noise reduction in image forming apparatuses such as copying machines and printers. An image forming apparatus includes a driving unit that applies a driving force to a rotating member such as a photosensitive drum, and an operating sound is generated due to operations of a motor, a fan, and the like at the time of image formation.

An operating sound of a driving unit that applies a driving force to a photosensitive drum, a developing roller, and an intermediate transfer belt is a large proportion in the operating sound of the entire image forming apparatus because a rotation speed of a motor is high and gears also mesh and rotate. A gear and a motor configuring a driving unit are held by a driving frame configuring a casing of the driving unit. When the driving unit is made silent, it is important to suppress vibration of a flat portion having a large area occupying the driving frame.

In Japanese Patent Application Laid-Open No. 2018-116316, a motor and a driving shaft, which are vibration members, are held by different holding members, so that the motor and the driving shaft do not vibrate synchronously with the holding members, and thus the vibrations of both the members are reduced.

In Japanese Patent Application Laid-Open No. 2005-31447, by fixing a heavy object that is a part of a component of an image forming apparatus to a frame component of a driving unit, the weight and rigidity of the entire driving unit are increased such that vibration is suppressed.

However, in Japanese Patent Application Laid-Open No. 2005-31447, since the heavy object is fixed to the frame component of the driving unit, flatness of the frame component may deteriorate. When the flatness of the frame component deteriorates, the parallelism (alignment) of gears held by the frame component deteriorates, and thus an operating sound may increase.

SUMMARY OF THE INVENTION

A representative configuration of the present invention is an image forming apparatus including a driving unit configured to apply a driving force to a photosensitive drum, in which the driving unit includes a driving gear having a shaft joint configured to engage with the photosensitive drum and transmit the driving force to the photosensitive drum, a first driving frame having a first through-hole configured to hold a shaft joint side of the driving gear, a second driving frame disposed opposite to the first driving frame and having a second through-hole configured to hold a side opposite to the shaft joint side of the driving gear and be located coaxially with the first through-hole, a first driving frame wall portion configured to extend in an axial direction of the driving gear from an end of a flat portion provided with the first through-hole of the first driving frame toward the second driving frame, and a second driving frame wall portion configured to extend in the axial direction from an end of a flat portion of the second driving frame provided with the second through-hole toward the first driving frame and face the first driving frame wall portion with a gap therebetween in a direction orthogonal to the axial direction, and an elastic member is compressed and held in a gap between the first driving frame wall portion and the second driving frame wall portion.

Further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the drawings. However, dimensions, materials, shapes, relative disposition, and the like of the components described in the following embodiments should be changed as appropriate depending on configurations of apparatuses to which the present invention is applied and various conditions, and the scope of the present invention is not intended to be limited to them.

<Image Forming Apparatus>

Figure 1:
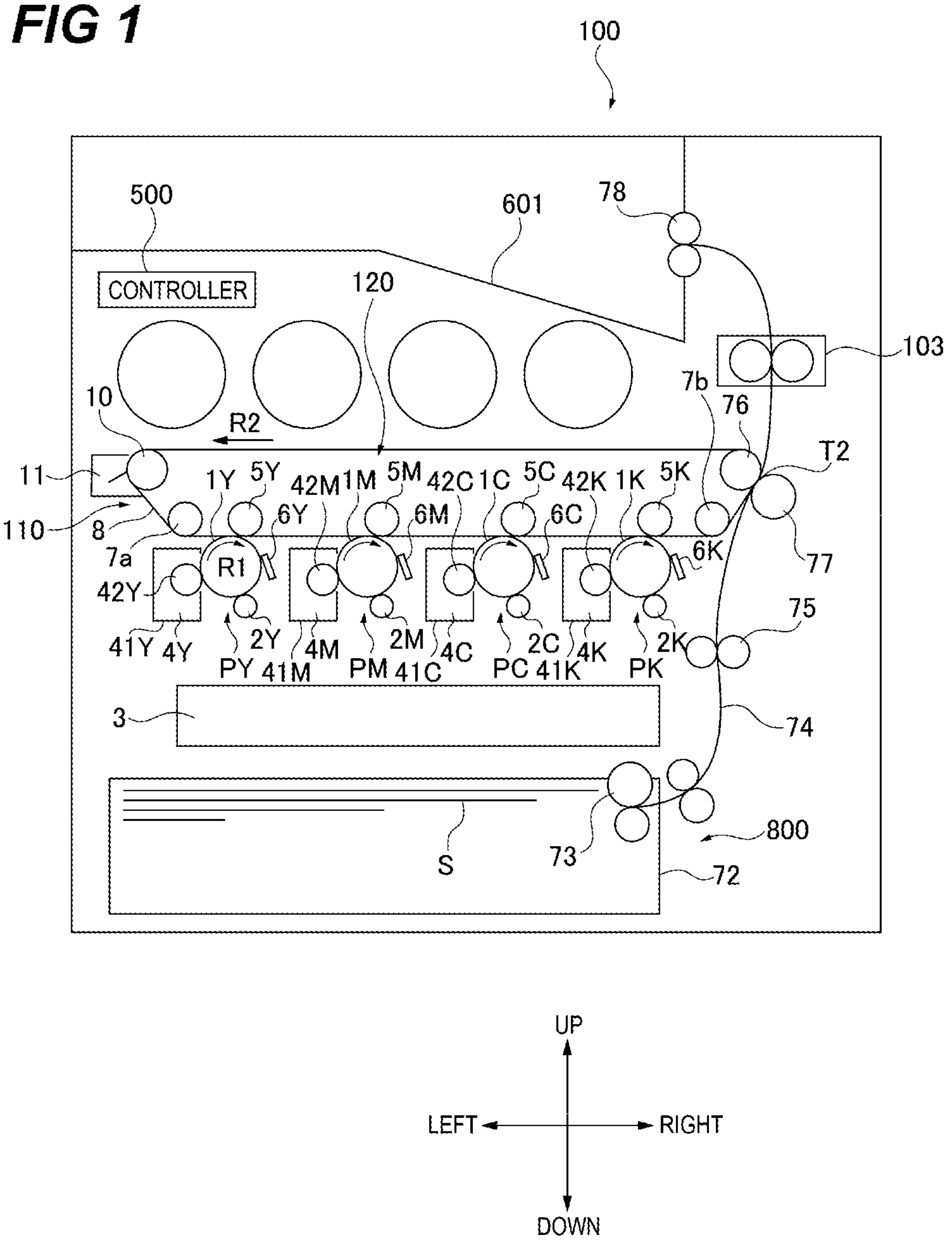
FIG. 1 is a schematic diagram illustrating a configuration of an image forming apparatus according to an embodiment.

An image forming apparatus according to the present embodiment will be described with reference to FIG. 1. FIG. 1 is a schematic sectional view illustrating a schematic configuration of an image forming apparatus according to the present embodiment.

An image forming apparatus 100 illustrated in FIG. 1 is a color image forming apparatus of an intermediate transfer tandem system in which image forming portions PY, PM, PC, and PK of four colors (yellow, cyan, magenta, black) are arranged in an apparatus body to face an intermediate transfer belt 8. Examples of a recording material S usable in the image forming apparatus 100 include various types of sheet materials such as paper such as plain paper, thick paper, rough paper, uneven paper, and coated paper, an overhead projector (OHP) sheet, a plastic film, and cloth. The image forming apparatus 100 is controlled by a controller 500.

The image forming apparatus 100 includes image forming portions PY to PK that form a toner image on a photosensitive drum 1, an intermediate transfer unit 110 having an intermediate transfer belt 8 that carries the toner image formed on the photosensitive drum 1, and a sheet feeding portion 800 that feeds the recording material S. In the case of the present embodiment, the image forming portions PY to PK, primary transfer rollers 5Y to 5K, the intermediate transfer belt 8, the secondary transfer inner roller 76, and the secondary transfer outer roller 77 constitute an image forming unit 120 that forms a toner image on the recording material S. The intermediate transfer unit 110 includes an intermediate transfer belt 8 that is an endless belt, a tension roller 10 that stretches the intermediate transfer belt 8, a secondary transfer inner roller 76, idler rollers 7*a* and 7*b*, and the like. The sheet feeding portion 800 includes a cassette 72, a sheet feeding roller 73, a conveyance path 74, and a registration roller 75.

Figure 2:
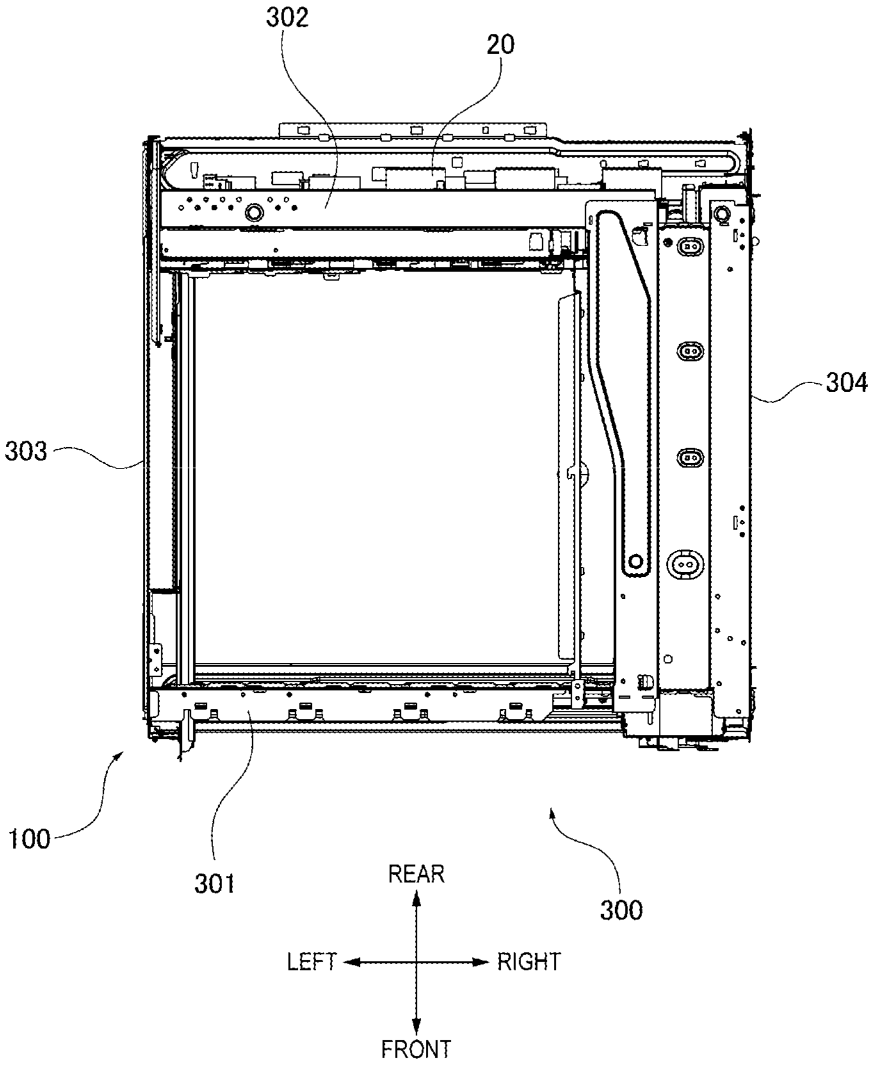
FIG. 2 is a diagram illustrating a positional relationship between a base frame and a driving unit.

As illustrated in FIG. 2, the image forming apparatus 100 includes a base frame 300 as a main body frame. The base frame 300 includes a front base frame 301, a rear base frame 302, a left base frame 303, and a right base frame 304.

The front base frame 301 is located on the front side in a front-rear direction of the image forming apparatus 100, and the rear base frame 302 is located on the rear side. The rear base frame 302 is disposed to face the front base frame 301 in the front-rear direction.

The left base frame 303 is located on the left side in a left-right direction orthogonal to the front-rear direction of the image forming apparatus 100, and the right base frame 304 is located on the right side. The right base frame 304 is disposed to face the left base frame 303 in the left-right direction. The left base frame 303 and the right base frame 304 are respectively attached to the front base frame 301 and the rear base frame 302.

Here, in the following description, in the image forming apparatus 100, a front base frame 301 side is defined as a front side (near side or front surface side), and a rear base frame 302 side is defined as a rear side (deep side or back surface side). The left base frame 303 side is defined as a left side, and the right base frame 304 side is defined as a right side. In other words, when the image forming portion PK that forms a black toner image is used as a reference, the side on which the image forming portion PY that forms a yellow toner image is disposed is defined as the left side. When the image forming portion PY that forms a yellow toner image is used as a reference, the side on which the image forming portion PK that forms a black toner image is disposed is defined as the right side. Furthermore, a direction perpendicular to the front-rear direction and the left-right direction defined here and upward in the vertical direction is defined as an up direction, and a direction perpendicular to the front-rear direction and the left-right direction defined here and downward in the vertical direction is defined as a down direction. The defined front, rear, right, left, up, and down directions are illustrated in FIGS. 4A to 5B.

The image forming portions PY to PK, the intermediate transfer unit 110, the sheet feeding portion 800, and the like are disposed in a space formed by the base frame 300. An exterior member (not illustrated) forming an exterior of the image forming apparatus 100 surrounds the outer periphery of the base frame 300, and a sound generated when the image forming apparatus 100 operates is less likely to reach the outside of the apparatus.

The image forming apparatus 100 includes a driving unit 20 that rotationally drives the image forming portions PY to PK and the intermediate transfer unit 110. The driving unit 20 is disposed on the back surfaces of the image forming portions PY to PK and the intermediate transfer unit 110 via the rear base frame 302. As will be described later, the driving unit 20 is attached to the back surface side of the rear base frame 302.

A conveyance process of the recording material S of the image forming apparatus 100 will be described. The recording material S is stored in a form of being stacked in the cassette 72, and is fed to a conveyance path 74 one by one according to an image forming timing by the sheet feeding roller 73. Further, the recording materials S stacked on a manual sheet feeding tray or a stacking apparatus (not illustrated) may be fed to the conveyance path 74 one by one. When the recording material S is conveyed to the registration roller 75 disposed in the middle of the conveyance path 74, skew feeding correction or timing correction of the recording material S are performed by the registration roller 75, and then the recording material S is sent to a secondary transfer portion T2. The secondary transfer portion T2 is a transfer nip portion formed by the secondary transfer inner roller 76 and the secondary transfer outer roller 77 facing each other. In the secondary transfer portion T2, the toner image is secondarily transferred from the intermediate transfer belt 8 to the recording material S.

A process of forming an image sent to the secondary transfer portion T2 at the same timing as the conveyance process of the recording material S to the secondary transfer portion T2 will be described. First, the image forming portions PY to PK will be described. However, the image forming portions PY to PK are configured substantially the same except that toner colors used in the developing devices 4Y, 4M, 4C, and 4K are different as yellow, magenta, cyan, and black. Therefore, hereinafter, the yellow image forming portion PY will be described as a representative example, and description of the other image forming portions PM, PC, and PK will be omitted. For convenience of illustration, only the image forming portion PY of the developing container 41Y and the developing roller 42Y that will be described later is denoted by a reference sign.

The image forming portion PY mainly includes a photosensitive drum 1Y as an image bearing member, a charging device 2Y as a process unit acting on the photosensitive drum 1Y, a developing device 4Y, a photosensitive drum cleaner 6Y, and the like. At the time of image formation, the photosensitive drum 1Y is rotationally driven in a direction of an arrow R1 at a predetermined process speed (circumferential velocity). A charging voltage is applied to the charging device 2Y by a high-voltage power supply (not illustrated), and a current flows between the charging device 2Y (charging roller) and the photosensitive drum 1Y, and thus a surface of the photosensitive drum 1Y is uniformly charged to a predetermined polarity and potential. An electrostatic latent image is formed on the charged photosensitive drum 1Y through exposure of an exposure device 3 based on image information. Toner is attached to the electrostatic latent image by the developing device 4Y, and the electrostatic latent image is developed as a toner image. The developing device 4Y includes a developing container 41Y containing a developer and a developing roller 42Y (also referred to as a developing sleeve) that bears and rotates the developer, and develops the electrostatic latent image as a toner image by applying a developing voltage to the developing roller 42Y. Thereafter, a predetermined pressurizing force and a primary transfer voltage are applied by the primary transfer roller 5Y disposed facing the image forming portion PY with the intermediate transfer belt 8 interposed therebetween, and the toner image formed on the photosensitive drum 1Y is primarily transferred onto the intermediate transfer belt 8. The transfer residual toner slightly remaining on the photosensitive drum 1Y after the primary transfer is removed by the photosensitive drum cleaner 6Y and provided again for the next image forming process.

The intermediate transfer belt 8 is stretched by the tension roller 10, the secondary transfer inner roller 76, and the idler rollers 7*a* and 7*b* as stretching rollers, and is driven to be moved in a direction of an arrow R2 in the drawing. In the present embodiment, the secondary transfer inner roller 76 also serves as a driving roller (rotating member) that drives the intermediate transfer belt 8. The image formation process of each color processed by the above-described image forming portions PY to PK is performed at the timing of sequentially superimposing the toner images of the colors upstream in the moving direction primarily transferred onto the intermediate transfer belt 8. As a result, a full-color toner image is finally formed on the intermediate transfer belt 8 and conveyed to the secondary transfer portion T2. The transfer residual toner after passing through the secondary transfer portion T2 is removed from the intermediate transfer belt 8 by the transfer cleaner device 11.

Through the conveyance process and the image forming process described above, timings of the recording material S and the full-color toner image coincide with each other in the secondary transfer portion T2, and the toner image is secondarily transferred from the intermediate transfer belt 8 to the recording material S. Thereafter, the recording material S is conveyed to a fixing device 103, and the toner image is melted and fixed onto the recording material S by being pressurized and heated by the fixing device 103. The recording material S on which the toner image has been fixed is discharged onto the discharge tray 601 by a discharge roller 78.

<Insertion and Removal of Intermediate Transfer Unit>

Figure 4A:
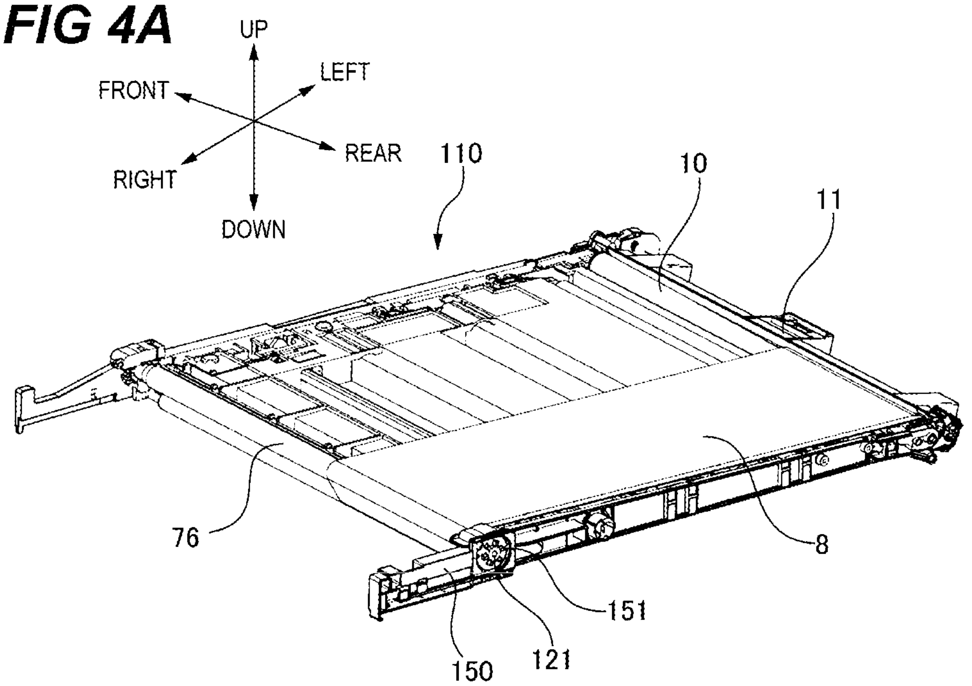
FIGS. 4A and 4B are diagrams illustrating insertion and removal of an intermediate transfer unit into and from the image forming apparatus.
Figure 4B:
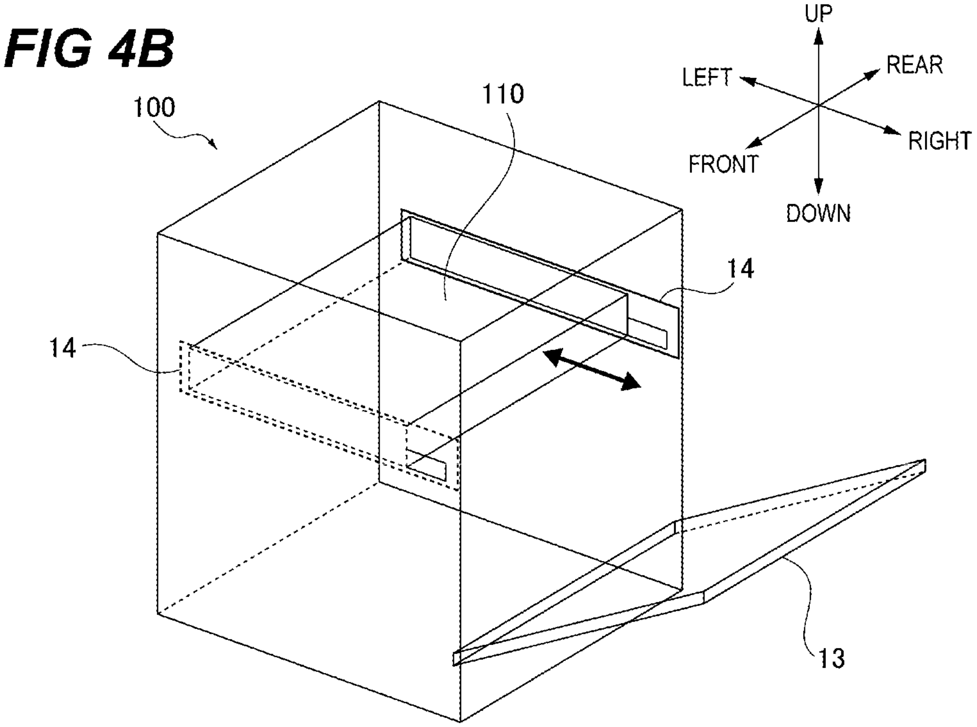

Next, insertion and removal of the intermediate transfer unit 110 in the present embodiment will be described with reference to FIGS. 4A and 4B. FIG. 4A is a schematic perspective view illustrating the intermediate transfer unit 110. In FIG. 4A, a part of the intermediate transfer belt on the front side is cut out. FIG. 4B is a perspective view schematically illustrating the intermediate transfer unit 110 in a state of being mounted on the image forming apparatus.

The intermediate transfer unit 110 is supported to be insertable into and removable from the image forming apparatus 100. In the intermediate transfer unit 110, a coupling 121, which is a shaft joint, is provided on the deep side of the secondary transfer inner roller (driving roller) 76 in order to supply and block the driving force from the driving unit 20 at the time of insertion and removal. In the present embodiment, the coupling 121 is manufactured by injection molding a resin material. A releasing member 150 capable of retracting a driving gear 253 (see FIG. 9) from the driving unit 20 in a thrust direction, which will be described in detail later, is provided in the vicinity of the coupling 121.

The image forming apparatus 100 is provided with a right door 13 that opens and closes the right side of the image forming apparatus 100 to divide the conveyance path of the recording material S from the sheet feeding roller 73 to the fixing device 103. Insertion and removal of the intermediate transfer unit 110 are performed by opening the right door 13. When the intermediate transfer unit 110 is taken out from the image forming apparatus 100, the releasing member 150 is operated to retract the driving gear 253 of the driving unit 20, and the intermediate transfer unit 110 is pulled out to the right side of the image forming apparatus 100. Conversely, the intermediate transfer unit 110 can be mounted on the image forming apparatus 100 by pushing the intermediate transfer unit 110 to the left side of the image forming apparatus 100. A rail 14 that supports the intermediate transfer unit 110 is attached to the image forming apparatus 100. The intermediate transfer unit 110 is guided by the rail 14, moved in the left-right direction (substantially horizontal direction) orthogonal to the front-rear direction of the image forming apparatus 100, and can be inserted into and removed from the image forming apparatus 100.

<Insertion and Removal of Photosensitive Drum>

Figure 5A:
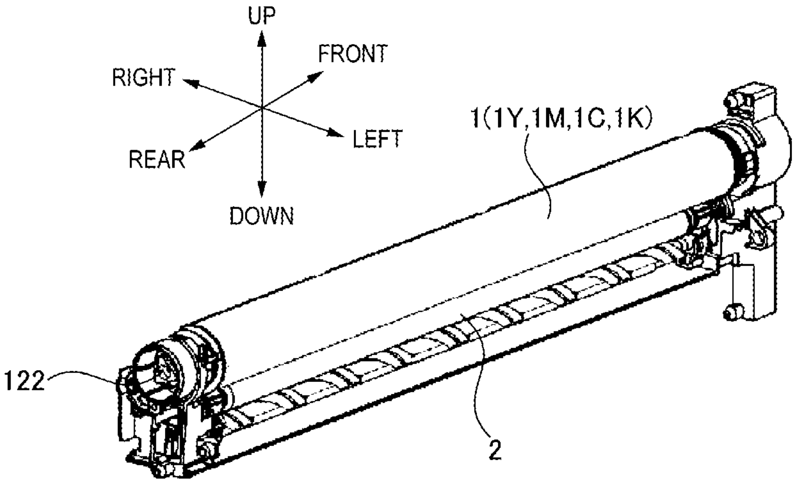
FIGS. 5A and 5B are diagrams illustrating insertion and removal of a photosensitive drum into and from the image forming apparatus.
Figure 5B:
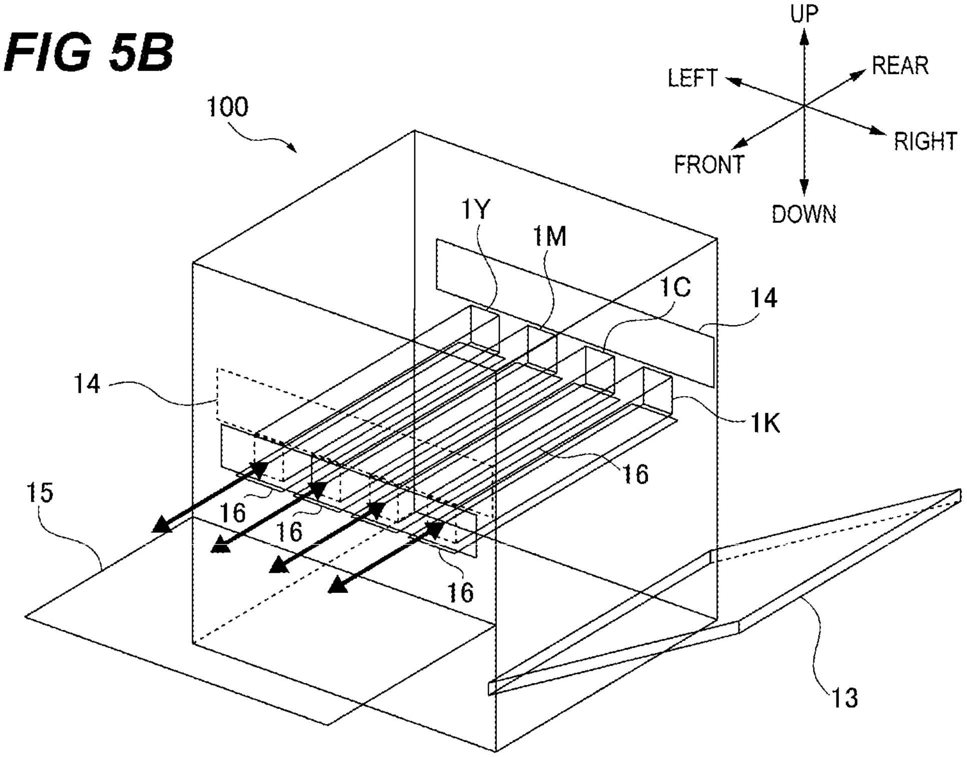

Next, insertion and removal of the photosensitive drum in the present embodiment will be described with reference to FIGS. 5A and 5B. FIG. 5A is a schematic perspective view illustrating the photosensitive drum 1. FIG. 5B is a perspective view schematically illustrating the photosensitive drum 1 in a state of being mounted on the image forming apparatus 100.

Similarly to the intermediate transfer unit 110, the photosensitive drum 1 is also supported to be insertable into and removable from the image forming apparatus 100. In the photosensitive drum 1, a drum coupling 122, which is a shaft joint on the driven side, is provided on the deep side of the photosensitive drum 1 in order to supply and block the driving force from the driving unit 20 at the time of insertion and removal. In the present embodiment, the drum coupling 122 is manufactured by injection molding a resin material.

The photosensitive drum 1 is inserted and removed by opening a front cover provided on the front side of the image forming apparatus 100. When the photosensitive drum 1 is taken out from the image forming apparatus 100, the photosensitive drum 1 is pulled out to the front side of the image forming apparatus 100. Conversely, the photosensitive drum 1 can be mounted on the image forming apparatus 100 by pushing the photosensitive drum 1 to the deep side of the image forming apparatus 100. A drum rail 16 that supports the photosensitive drum 1 is attached to the image forming apparatus 100. The photosensitive drum 1 is guided by the drum rail 16, moved in the front-rear direction (substantially horizontal direction) of the image forming apparatus 100, and can be inserted into and removed from the image forming apparatus 100.

<Attachment Configuration of Driving Unit>

Next, a method of attaching the driving unit 20 to the base frame 300 will be described with reference to FIGS. 2 to 3B.

FIG. 2 is a schematic top view of the base frame 300 to which the driving unit is attached. Note that other units attached to the base frame 300 are not illustrated. The front base frame 301 is located on the front side in a front-rear direction of the image forming apparatus 100, and the rear base frame 302 is located on the rear side. The rear base frame 302 is disposed to face the front base frame 301, and the left base frame 303 and the right base frame 304 are respectively attached to the front base frame 301 and the rear base frame 302. The driving unit 20 is located behind the image forming unit 120, and a second driving frame 202 that will be described later is attached to the rear base frame 302 of the apparatus body.

Figure 3A:
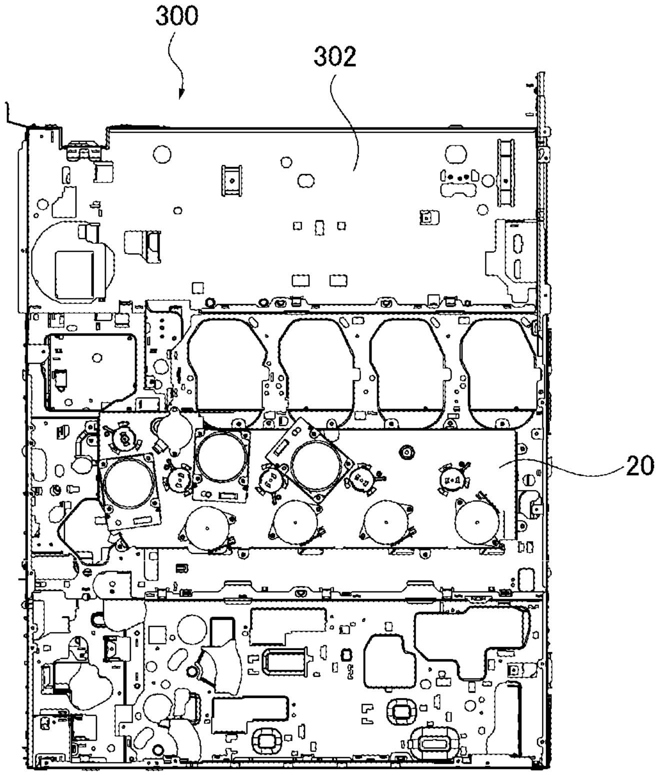
FIGS. 3A and 3B are diagrams illustrating a method of holding the driving unit.
Figure 3B:
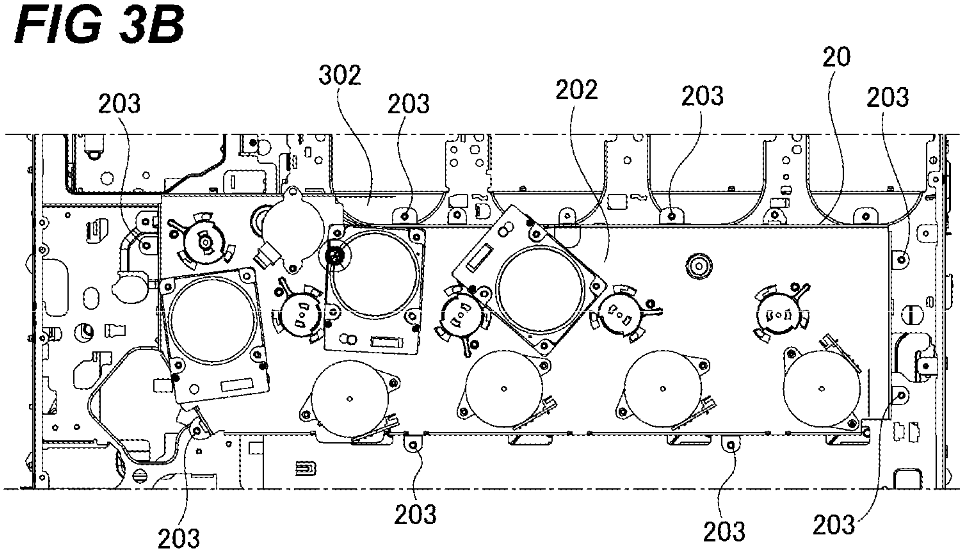

FIG. 3A is a diagram of the base frame 300 to which the driving unit 20 is attached when viewed from the rear. Similarly to FIG. 2, FIG. 3A is a diagram in which units other than the driving unit are not illustrated. FIG. 3B is a diagram of the vicinity of the driving unit 20 when viewed from the rear of the base frame 300. As shown in FIGS. 3A and 3B, the second driving frame 202 of the driving unit 20 faces the rear base frame 302, and includes a driving unit fixing screw hole 203 which is a screw mounting hole used to fix the driving unit 20. Here, the second driving frame 202 includes two driving unit fixing screw holes 203 on each of the upper, lower, left, and right sides. A screw is attached to the driving unit fixing screw hole 203 to fix the driving unit 20 to the rear base frame 302.

<Configuration of Driving Unit>

Figure 6A:
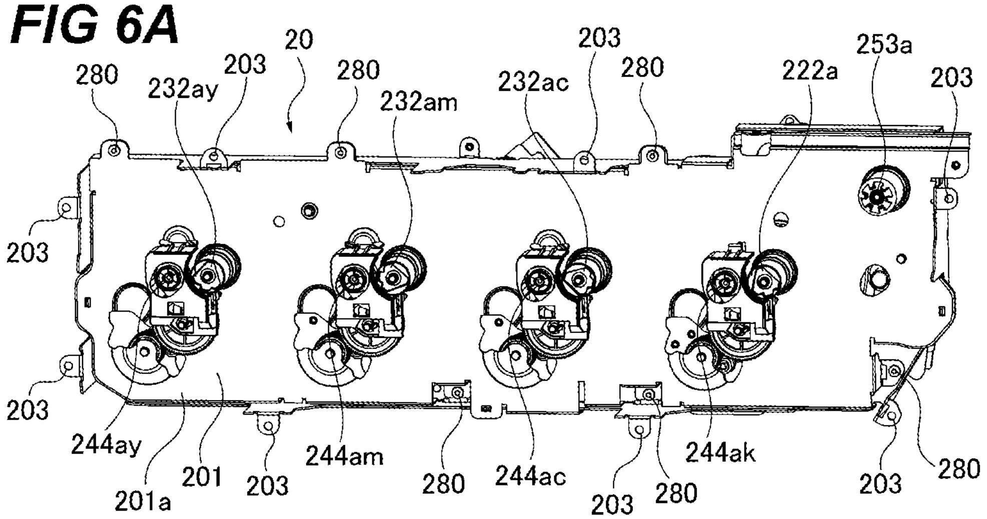
FIGS. 6A, 6B, and 6C are schematic diagrams of the driving unit.
Figure 6B:
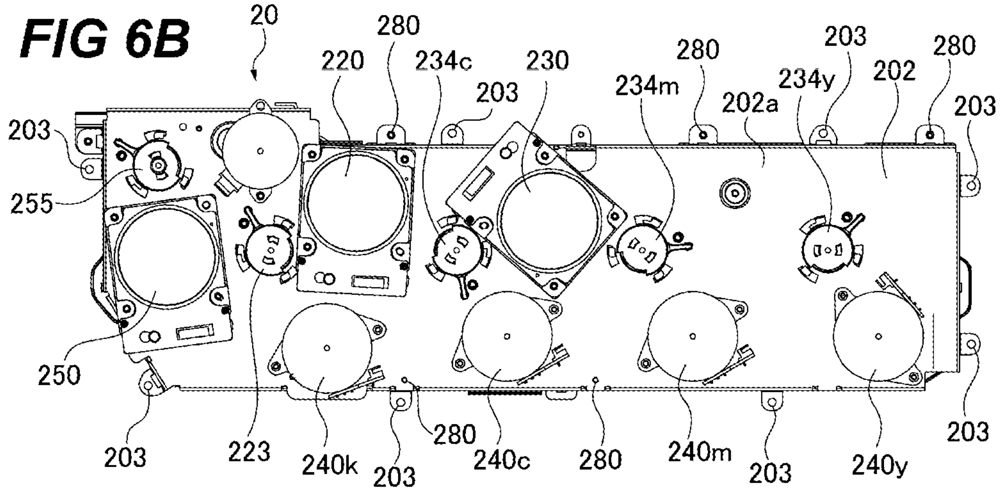
Figure 6C:
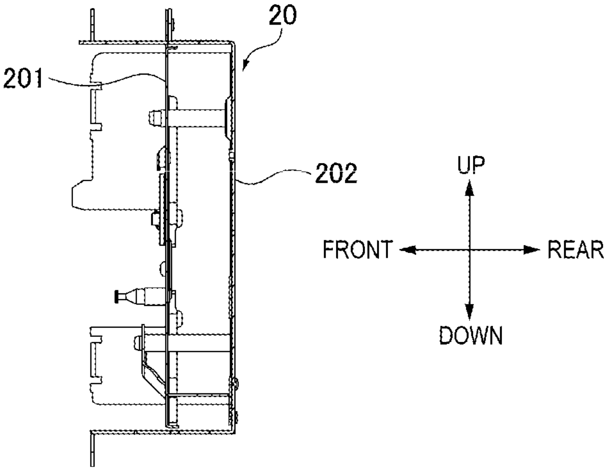

Next, a configuration of the driving unit 20 according to the present embodiment will be described with reference to FIGS. 6A to 6C. FIG. 6A is a front perspective view of the driving unit when viewed from the front. FIG. 6B is a view of the driving unit when viewed from the rear. FIG. 6C is a sectional view of the driving unit 20.

The driving unit 20 is a driving unit that applies a driving force to the rotating member. Here, the photosensitive drum 1 (1Y, 1M, 1C, 1K) is exemplified as the rotating member.

As shown in FIGS. 6A and 6B, the driving unit 20 includes a first driving frame 201 made of a steel plate and a second driving frame 202 also made of a steel plate. The first driving frame 201 and the second driving frame 202 are framed by being fastened by screws at a driving frame fastening portion 280. In other words, in the driving unit 20, the first driving frame 201 and the second driving frame 202 configure a casing.

As shown in FIG. 6C, the first driving frame 201 is disposed on the front side of the second driving frame 202 in the front-rear direction, and the first driving frame 201 is disposed to face the second driving frame 202.

Figure 7:
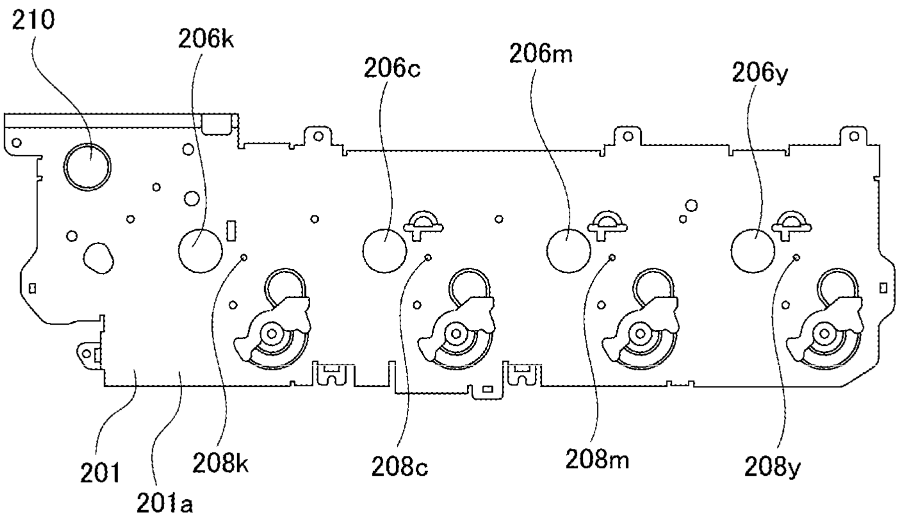
FIG. 7 is a diagram illustrating a first driving frame.

FIG. 7 illustrates the first driving frame 201. FIG. 7 is a view of the first driving frame 201 when viewed from the rear of the image forming apparatus. The first driving frame 201 includes a plurality of first through-holes 206*k*, 206*c*, 206*m*, and 206*y* that hold shaft joint sides of drum driving gears 222, 232*c*, 232*m*, and 232*y* that are driving gears used to drive the photosensitive drum. Here, the shaft joints of the drum driving gears 222, 232*c*, 232*m*, and 232*y* are main body-side drum couplings 222*a*, 232*ac*, 232*am*, and 232*ay* that engage with the photosensitive drum 1 that is a rotating member and transmit a driving force to each photosensitive drum 1. The first through-holes 206*y*, 206*m*, 206*c*, and 206*k* for the drum driving gears are provided in a flat portion 201*a* of the first driving frame 201 at equal intervals in the left-right direction. Similarly, the first driving frame 201 includes first developing gear through-holes 208*y*, 208*m*, 208*c*, and 208*k* that hold developing coupling-side gears 244*y*, 244*m*, 244*c*, and 244*k* that are driving gears used to drive the developing rollers. The first developing gear through-holes 208*y*, 208*m*, 208*c*, and 208*k* are provided in the flat portion 201*a* of the first driving frame 201 at equal intervals in the left-right direction. Further, the first driving frame 201 has a first intermediate transfer belt gear through-hole 210 that holds a shaft joint side of an intermediate transfer belt driving gear 253 which is a driving gear used to drive the intermediate transfer belt. One first intermediate transfer belt gear through-hole 210 is provided in the flat portion 201*a* of the first driving frame 201. Here, the shaft joint of the intermediate transfer belt driving gear 253 is an intermediate transfer belt coupling 252*a* that engages with a driving roller (secondary transfer inner roller 76) of the intermediate transfer belt 8 and transmits a driving force to the intermediate transfer belt 8.

As illustrated in FIG. 6B, the driving unit 20 includes a motor that is a driving source that applies a driving force to the driving gear. Specifically, the driving unit 20 includes a black drum motor 220, a color drum motor 230, developing motors 240*y*, 240*m*, 240*c*, and 240*k* for yellow, magenta, cyan, and black, and an intermediate transfer belt motor 250. The black drum motor 220 is a driving source that applies a driving force to the black drum driving gear 222. The color drum motor 230 is a driving source that applies a driving force to the yellow drum driving gear 232*y*, the magenta drum driving gear 232*m*, and the cyan drum driving gear 232*c*. The developing motors 240*y*, 240*m*, 240*c*, and 240*k* for yellow, magenta, cyan, and black are driving sources that apply driving forces to the developing coupling-side gears 244*y*, 244*m*, 244*c*, and 244*k*, respectively. The intermediate transfer belt motor 250 is a driving source that applies a driving force to the intermediate transfer belt driving gear 253. The motors 220, 230, 240*y*, 240*m*, 240*c*, 240*k*, and 250 that are driving sources are attached to the second driving frame 202 of the driving unit 20.

Figure 8:
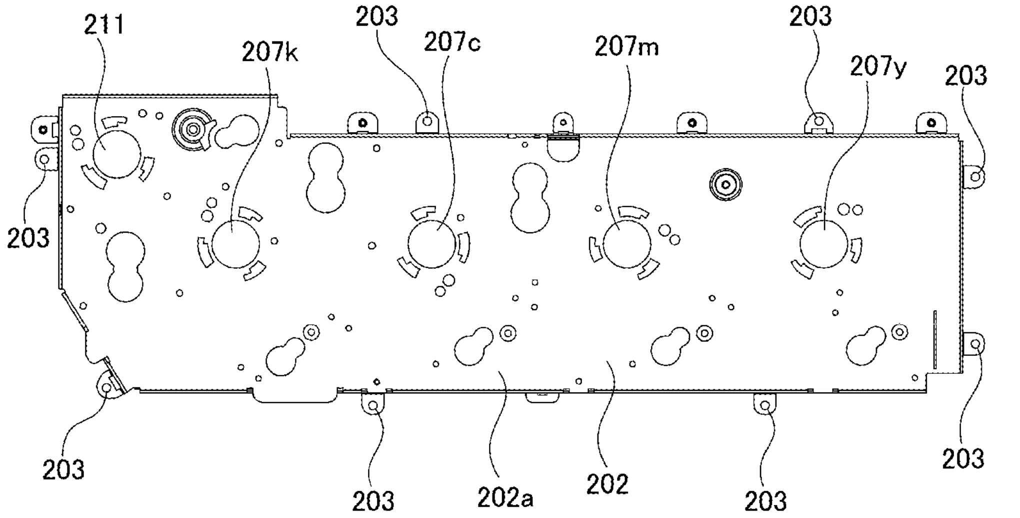
FIG. 8 is a diagram illustrating a second driving frame.

The second driving frame 202 is illustrated in FIG. 8. FIG. 8 is a view of the second driving frame 202 when viewed from the rear of the image forming apparatus. The second driving frame 202 includes a plurality of second through-holes 207*k*, 207*c*, 207*m*, and 207*y* that hold the opposite sides of the drum driving gears 222, 232*c*, 232*m*, and 232*y*, which are driving gears used to drive the photosensitive drums, from the shaft joint side. The second through-holes 207*y*, 207*m*, 207*c*, and 207*k* for the drum driving gear are provided to be located coaxially with the first through-holes 206*y*, 206*m*, 206*c*, and 206*k*, respectively. The second through-holes 207*y*, 207*m*, 207*c*, and 207*k* are provided in the flat portion 202*a* of the second driving frame 202 at equal intervals in the left-right direction. Further, the second driving frame 202 has a second intermediate transfer belt gear through-hole 211 that holds the side opposite to the shaft joint side of the intermediate transfer belt driving gear 253 that is a driving gear used to drive the intermediate transfer belt. One second intermediate transfer belt gear through-hole 211 is provided in the flat portion 202*a* of the second driving frame 202. The second intermediate transfer belt gear through-hole 211 is provided coaxially with the first intermediate transfer belt gear through-hole 210.

<Method of Driving Photosensitive Drum>

Figure 9:
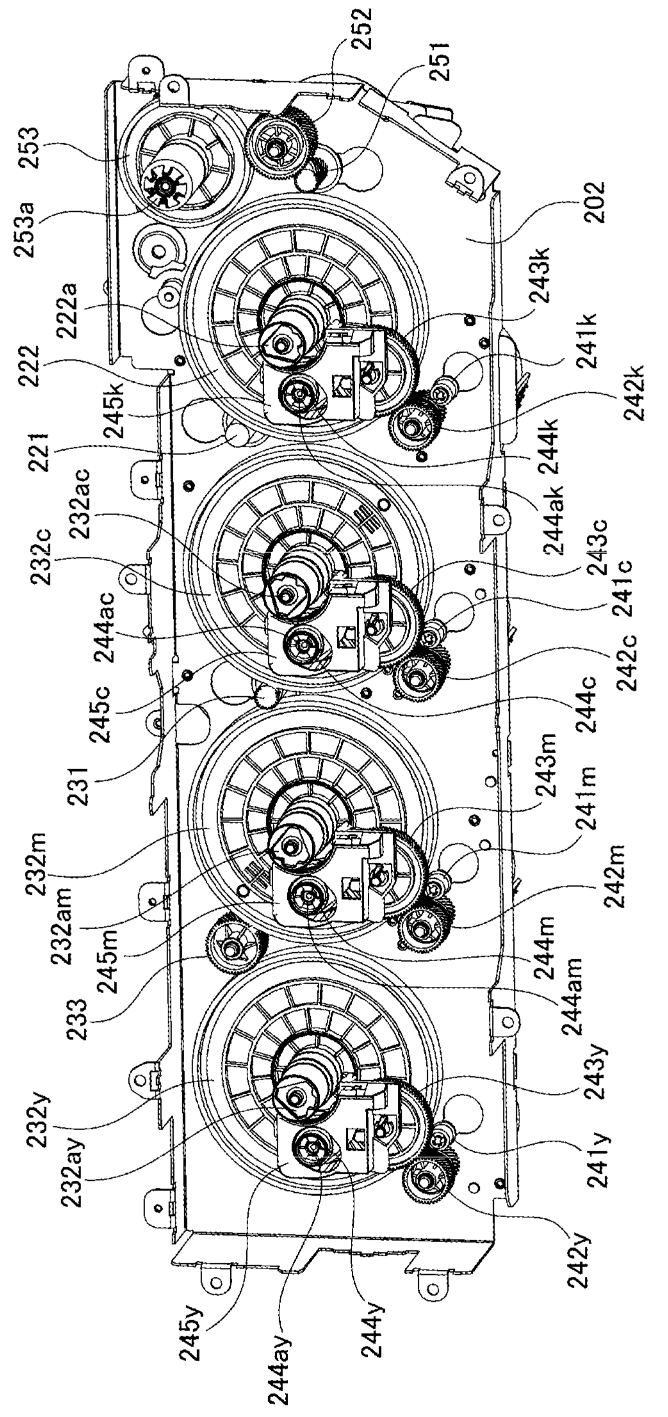
FIG. 9 is an explanatory diagram of a gear train of the driving unit.

Next, a method of driving the photosensitive drum will be described with reference to FIG. 9. FIG. 9 is an arrangement diagram of the driving gears used to drive the photosensitive drum, the developing roller, and the intermediate transfer belt.

First, a method of driving the black photosensitive drum 1K will be described.

The driving unit 20 includes a drum motor 220, a drum motor gear 221, and a drum driving gear 222 for black in order to drive the black photosensitive drum 1K. The black drum driving gear 222 includes a black main body-side drum coupling 222*a* at a front gear shaft tip portion. The black main body-side drum coupling 222*a* is formed to mesh with the drum coupling 122 (see FIG. 5A) provided at the rear end of the photosensitive drum 1K when the black photosensitive drum 1K is mounted on the image forming apparatus 100. A black drum gear holding member 223 (FIG. 6B) is held by the second driving frame 202. The black drum driving gear 222 is held by the black drum gear holding member 223 to be located coaxially with the black drum gear holding member 223. The black motor gear 221 is attached to the shaft of the black drum motor 220. The black motor gear 221 is disposed to mesh with the black drum driving gear 222. The black drum motor 220 rotationally drives the black photosensitive drum 1K via the drum motor gear 221, the drum driving gear 222, and the main body-side drum coupling 222*a* for black.

Next, a method of driving the color photosensitive drums 1Y, 1M, and 1C will be described.

The driving unit 20 includes the following motors and gears driving the photosensitive drums 1Y, 1M, and 1C for yellow, magenta, and cyan, respectively. That is, the driving unit 20 includes a color drum motor 230, a color motor gear 231, drum driving gears 232*y*, 232*m*, and 232*c* for yellow, magenta, and cyan, and the yellow drum intermediate gear 233. The drum driving gears 232*y*, 232*m*, and 232*c* for yellow, magenta, and cyan have main body-side drum couplings 232*ay*, 232*am*, and 232*ac* for yellow, magenta, and cyan, respectively, at the front gear shaft tip portion. The main body-side drum couplings 232*ay*, 232*am*, and 232*ac* are formed to mesh with the drum couplings 122 (see FIG. 5A) provided at the rear ends of the photosensitive drums 1Y, 1M, and 1C when the photosensitive drums 1Y, 1M, and 1C for yellow, magenta, and cyan are mounted on the image forming apparatus 100. The second driving frame 202 holds the drum gear holding members 234*y*, 234*m*, and 234*c* for yellow, magenta, and cyan (FIG. 6B). The drum driving gears 232*y*, 232*m*, and 232*c* for yellow, magenta, and cyan are held by the drum gear holding members 234*y*, 234*m*, and 234*c* to be located coaxially with the drum gear holding members 234*y*, 234*m*, and 234*c* for yellow, magenta, and cyan, respectively. The color motor gear 231 is attached to the shaft of the color drum motor 230. The color motor gear 231 is disposed to mesh with both the magenta drum driving gear 232*m* and the cyan drum driving gear 232*c*. The yellow drum intermediate gear 233 is disposed to mesh with both the yellow drum driving gear 232*y* and the magenta drum driving gear 232*m*. The color drum motors 230 rotationally drive the color photosensitive drums 1Y, 1M, and 1C via the color motor gears 231, the color drum intermediate gears 233, and the drum driving gears 232*y*, 232*m*, and 232*c* for yellow, magenta, and cyan, respectively.

<Method of Driving Developing Roller>

Next, a method of driving the developing roller will be described. Here, the yellow developing roller 42Y will be described.

In order to drive the yellow developing roller 42Y, the driving unit 20 includes a yellow developing motor 240*y* illustrated in FIG. 6B, a yellow developing motor-side gear 241*y* illustrated in FIG. 9, a developing intermediate first gear 242*y*, a developing intermediate second gear 243*y*, and a developing coupling-side gear 244*y*. The yellow developing coupling-side gear 244*y* includes a yellow main body-side developing coupling 244*ay* at the front gear shaft tip portion. The main body-side developing coupling 244*ay* is formed to mesh with a coupling (not illustrated) provided at the rear end of the yellow developing roller 42Y.

The yellow developing motor 240*y* is held by the second driving frame 202, and the yellow developing motor-side gear 241*y* is attached to a driving shaft of the yellow developing motor 240*y*. The yellow developing intermediate first gear 242*y* is disposed between the first driving frame 201 and the second driving frame 202, and is disposed to mesh with the yellow developing motor-side gear 241*y*. The yellow developing intermediate second gear 243*y* and the developing coupling-side gear 244*y* are held on the front surface side of the first driving frame 201 by the yellow developing coupling holding member 245*y*. The yellow developing intermediate second gear 243*y* is disposed to mesh with the yellow developing intermediate first gear 242*y*, and the yellow developing coupling-side gear 244*y* is disposed to mesh with the yellow developing intermediate second gear 243*y*. The yellow developing motor 240*y* rotationally drives the yellow developing roller 42Y via the yellow developing motor-side gear 241*y*, the developing intermediate first gear 242*y*, the developing intermediate second gear 243*y*, the developing coupling-side gear 244*y*, and the main body-side developing coupling 244*ay*.

Each configuration that drives the magenta developing roller 42M, the cyan developing roller 42C, and the black developing roller 42K is similar to the configuration that drives the yellow developing roller 42Y, and the description thereof will be omitted.

<Method of Driving Intermediate Transfer Belt>

A method of driving the intermediate transfer belt 8 will be described. In order to drive the intermediate transfer belt 8, the driving unit 20 includes a motor 250 for the intermediate transfer belt illustrated in FIG. 6B, and a motor gear 251, an intermediate gear 252, and a driving gear 253 for the intermediate transfer belt illustrated in FIG. 9. The intermediate transfer belt driving gear 253 includes an intermediate transfer belt coupling 253*a* at the front gear shaft tip portion. When the intermediate transfer unit 110 is mounted on the image forming apparatus 100, the intermediate transfer belt coupling 253*a* is formed to mesh with the coupling 121 (FIG. 4A) provided at the rear end of the secondary transfer inner roller 76 that is a driving roller of the intermediate transfer belt 8. The second driving frame 202 holds an intermediate transfer belt driving gear holding member 255 (FIG. 6B). The intermediate transfer belt driving gear 253 is held by the intermediate transfer belt driving gear holding member 255 to be located coaxially with the intermediate transfer belt driving gear holding member 255. The intermediate transfer belt motor gear 251 is attached to a shaft of the intermediate transfer belt motor 250. The motor gear 251 for the intermediate transfer belt is disposed to mesh with the intermediate gear 252 for the intermediate transfer belt. The intermediate transfer belt intermediate gear 252 is disposed between the first driving frame 201 and the second driving frame 202, and is disposed to mesh with the intermediate transfer belt driving gear 253. The intermediate transfer belt driving gear 253 is disposed between the first driving frame 201 and the second driving frame 202. The intermediate transfer belt motor 250 rotationally drives the intermediate transfer belt 8 via the motor gear 251, the intermediate gear 252, and the driving gear 253 for the intermediate transfer belt, and the coupling 253*a* for the intermediate transfer belt.

A frequency of a sound generated from the driving unit including the gears and the motors is a meshing frequency that is a product of the number of teeth of the gears and a rotation speed. The meshing frequency in the driving unit 20 of the present embodiment is 314 Hz.

<Configuration of Casing of Driving Unit>

Next, a configuration of a casing of the driving unit 20, which is framed by the first driving frame 201 and the second driving frame 202, will be described.

The drum driving gears 222, 232*y*, 232*m*, and 232*c* of the respective colors provided in the driving unit 20 are pressed in the axial direction toward the photosensitive drum 1 by a pressing member (not illustrated) such as a spring provided between the drum driving gear and the drum gear holding member that holds the drum driving gear. Thus, the drum driving gears 222, 232*y*, 232*m*, and 232*c* of the respective colors provided in the driving unit 20 are reliably joined (engaged) to the photosensitive drums 1 provided in the image forming portions P of the respective colors at their coupling portions. In this case, when the rigidity of the first driving frame 201 and the second driving frame 202 is low, the flatness of both the driving frames 201 and 202 deteriorates due to a pressing force of the pressing member, and the alignment of the gear shaft with the gear meshing with the drum driving gear is deteriorated. If the alignment deteriorates, the meshing accuracy of the drum driving gear also deteriorates, so that vibration increases, and as a result, an image defect corresponding to the gear tooth pitch of the drum driving gear may occur.

Figure 10:
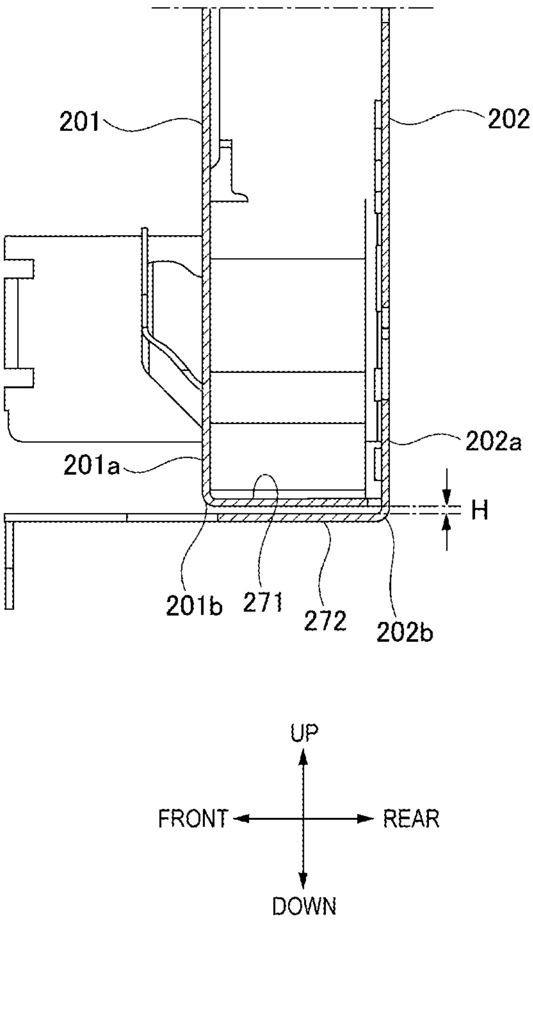
FIG. 10 is an explanatory diagram of a first driving frame wall portion and a second driving frame wall portion facing each other.

In order to prevent such an image defect, driving frame wall portions 271 and 272 illustrated in FIG. 10 are respectively provided at ends of the flat portions 201*a* and 202*a* of the driving frames 201 and 202 to increase rigidity of the holding portions of the drum driving gears of both the driving frames 201 and 202.

The first driving frame wall portion 271 is formed in a shape in which the first driving frame 201 extends in the axial direction of the driving gear from an end 201*b* of the flat portion 201*a* toward the second driving frame 202. The second driving frame wall portion 272 is formed in a shape in which the second driving frame 202 extends in the axial direction from an end 202*b* of the flat portion 202*a* toward the first driving frame 201. Here, the axial direction of the driving gear is a direction that coincides with the front-rear direction of the image forming apparatus 100.

The driving frame wall portions 271 and 272 are provided at locations other than fastening portions that fasten the first driving frame 201 and the second driving frame 202. In the present embodiment, as illustrated in FIGS. 6A and 6B, the first driving frame 201 and the second driving frame 202 are fastened by screws at fastening portions 280. The driving frame wall portions 271 and 272 are provided at locations other than the fastening portions 280.

It is preferable that the driving frame wall portions 271 and 272 are provided over the entire circumference of the outer peripheral portions of the ends 201*b* and 202*b* of the flat portions 201*a* and 202*a* of the driving frames 201 and 202. However, there are various restrictions in practice, and the driving frame wall portions 271 and 272 are provided at some of the ends 201*b* and 202*b* of the flat portions 201*a* and 202*a*. Therefore, the driving frame wall portions 271 and 272 are provided at least in the vicinity of the drum gear through-holes 206 and 207 holding the drum driving gear.

<Driving Frame Wall Portion>

The driving frame wall portions 271 and 272 will be described with reference to FIG. 10. FIG. 10 is a partial sectional view in a state in which the first driving frame 201 and the second driving frame 202 according to the present embodiment are fastened. In FIG. 10, gears and the like are not illustrated for description of the driving frame wall portions 271 and 272, and only the driving frames 201 and 202 are illustrated.

The wall portions include the first driving frame wall portion 271 provided at the end 201*b* of the flat portion 201*a* of the first driving frame 201 and the second driving frame wall portion 272 provided at the end 202*b* of the flat portion 202*a* of the second driving frame 202. In the present embodiment, the first driving frame wall portion 271 is provided in a region 273 including a straight line L in a second direction passing through the center of each of the plurality of first through-holes 206, orthogonal to a straight line C in a first direction passing through the centers of the first through-holes 206. The second driving frame wall portion 272 is provided to face the first driving frame wall portion 271 with a gap H therebetween in the second direction orthogonal to the axial direction. The second driving frame wall portion 272 is provided in the region 273 including the straight line L in the second direction passing through the center of each of the plurality of first through-holes 206, orthogonal to the straight line C in the first direction passing through the centers of the first through-holes 206.

Figure 11:
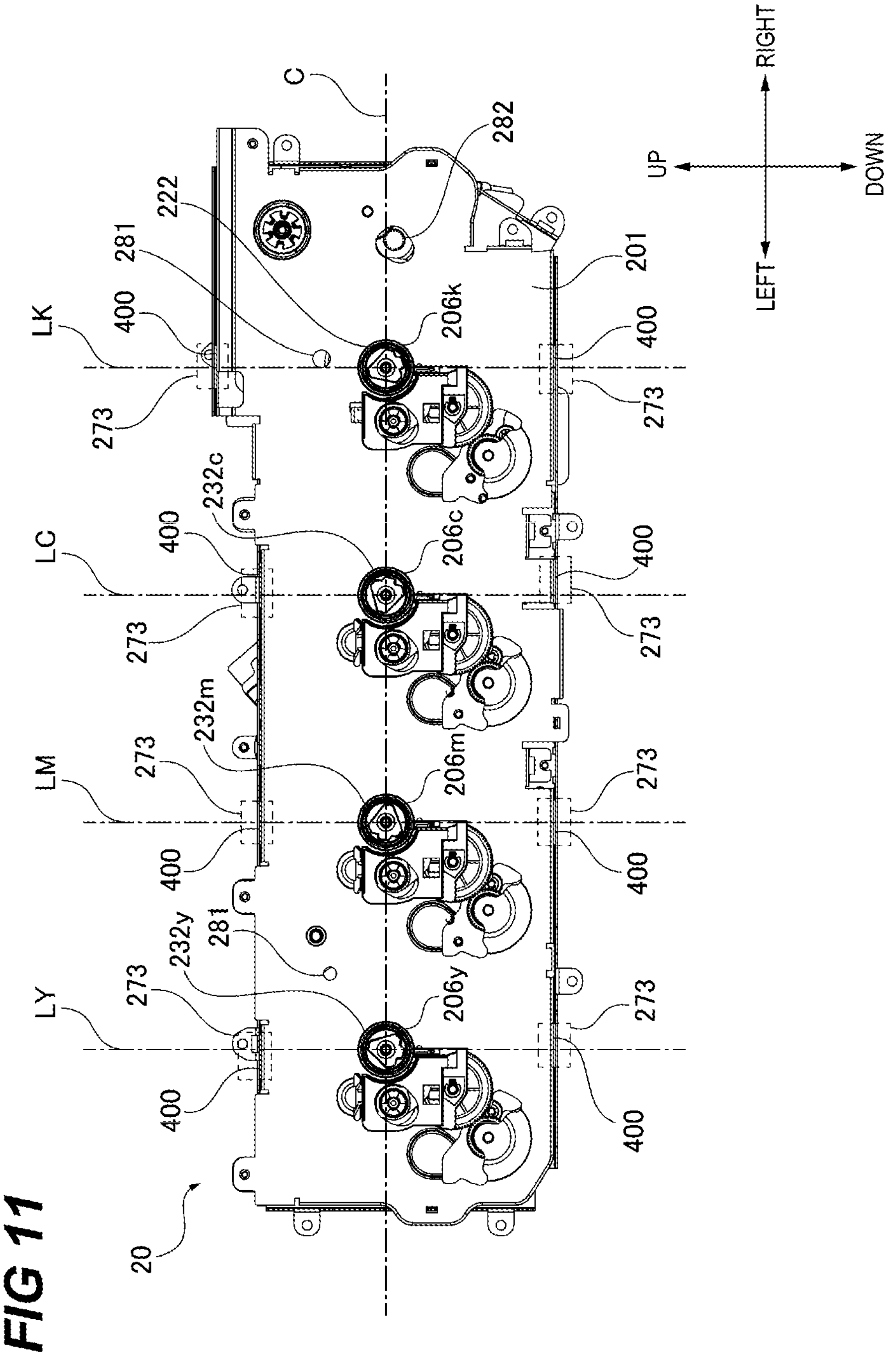
FIG. 11 is a diagram illustrating a region where an elastic member is provided in the driving unit.

Here, the first direction is a direction that coincides with the left-right direction of the image forming apparatus 100. The second direction orthogonal to the first direction is a direction that coincides with the vertical direction of the image forming apparatus 100. The axial direction is an axial direction of the drum driving gear 222 and the like, and is a direction that coincides with the front-rear direction of the image forming apparatus 100 orthogonal to the first direction and the second direction. FIG. 11 illustrates the straight line C in the first direction passing through the centers of the plurality of first through-holes 206. Similarly, FIG. 11 illustrates the straight line L in the second direction passing through the center of each of the first through-holes 206, orthogonal to the straight line C. The straight line L indicates straight lines LY, LM, LC, and LK of the respective colors.

In the driving unit 20 that drives the four photosensitive drums as in the present embodiment, the first driving frame 201 and the second driving frame 202 hold the four drum driving gears 222, 232*c*, 232*m*, and 232*y*. The drum driving gears 222, 232*c*, 232*m*, and 232*y* are respectively held by the four drum gear through-holes 206*k*, 206*c*, 206*m*, and 206*y* and the four drum gear through-holes 207*k*, 207*c*, 207*m*, and 207*y* located coaxially therewith. The pair of the first driving frame wall portion 271 and the second driving frame wall portion 272 facing each other with the gap H therebetween are disposed to face each other via the drum driving gears 222, 232*c*, 232*m*, and 232*y* in the regions 273 including the straight lines LK, LC, LM, and LY passing through the centers of the through-holes 206*k*, 206*c*, 206*m*, and 206*y* holding the drum driving gears 222, 232*c*, 232*m*, and 232*y*. In the present embodiment, the pairs of the first driving frame wall portion 271 and the second driving frame wall portion 272 are provided in eight regions 273 indicated by dashed lines in FIG. 11. A height (a length in the front-rear direction) of each of the driving frame wall portions 271 and 272 is set to 20 mm. With such disposition, the rigidity of the holding portion of each drum driving gear of both the driving frames 201 and 202 is efficiently increased.

Here, the first driving frame wall portion 271 and the second driving frame wall portion 272 are not provided between the region 273 including the straight line L and the region 273 including the straight line L adjacent to the region 273 in the left-right direction. Specifically, the first driving frame wall portion 271 and the second driving frame wall portion 272 are not provided between the region 273 including the straight line LY and the region 273 including the straight line LM, between the region 273 including the straight line LM and the region 273 including the straight line LC, and between the region 273 including the straight line LC and the region 273 including the straight line LK. In other words, the first driving frame wall portion 271 and the second driving frame wall portion 272 are provided at a plurality of locations in the left-right direction at intervals.

The gap H of several millimeters is provided between the first driving frame wall portion 271 and the second driving frame wall portion 272 facing each other such that the first driving frame wall portion 271 and the second driving frame wall portion 272 do not contact each other. Here, when both the driving frame wall portions 271 and 272 come into contact with each other, distortion occurs between the first driving frame 201 and the second driving frame 202 due to the contact, flatness of the driving frame deteriorates, and alignment of the drum driving gear may deteriorate. Therefore, the gap H is provided between the first driving frame wall portion 271 and the second driving frame wall portion 272 facing each other to maintain the flatness of the driving frames 201 and 202.

Specifically, a dimensional error occurs in a shape of each component mass-produced due to variations in material lots and processing accuracy. For example, shapes such as a straight line, a plane, and a bending angle have a dimensional error of several tens μm to several hundreds μm depending on components. In a configuration in which the facing driving frame wall portions contact each other, a local position where the driving frame wall portions actually contact each other may be different for each component. That is, since displacement of the shape of the driving frame is different for each component, there is a possibility that variations occur for each individual of the driving units, such as good or bad alignment of the drum driving gear. In order to prevent such variations and stabilize the quality of the driving units, the gap H is provided between the first driving frame wall portion 271 and the second driving frame wall portion 272 facing each other.

<Elastic Member 22

Figure 12:
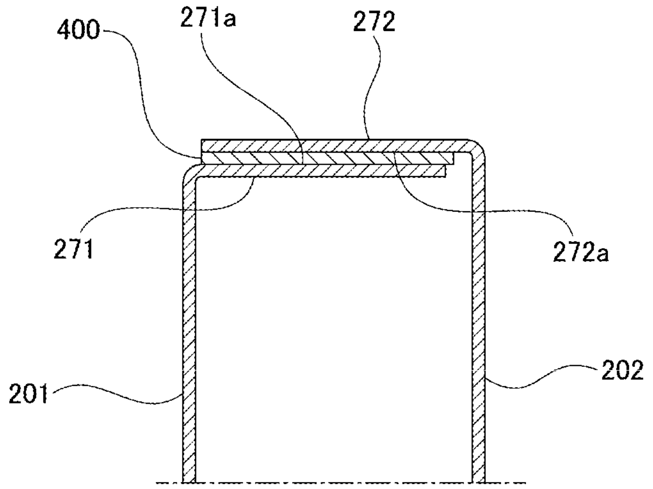
FIG. 12 is an explanatory diagram of an elastic member provided on a driving frame wall portion.

Next, the elastic member 400 will be described with reference to FIGS. 11 and 12. FIG. 11 is a diagram illustrating a region where an elastic member is provided in the driving unit. FIG. 12 is an explanatory diagram of an elastic member provided on the driving frame wall portion.

The driving unit 20 compresses and holds the elastic member 400 having a thickness larger than the dimension of the gap H in the gap H between the first driving frame wall portion 271 and the second driving frame wall portion 272 in the region 273 including the straight line L passing through the center of each of the first through-holes 206.

The first driving frame 201 and the second driving frame 202 in the present embodiment are steel plates having a thickness of 1 mm. As the elastic member 400, a foam material (EPTOSEILA EC-100 manufactured by Nitto Denko Corporation, compression hardness: 50% and 0.28 N/cm 2) made of EPDM is used. A length (a length in the left-right direction) of the elastic member 400 with respect to the outer peripheral direction of the driving frames 201 and 202 is 20 mm. A thickness of the elastic member 400 is 3 mm, and the gap H between the first driving frame wall portion 271 and the second driving frame wall portion 272 facing each other is 1 mm. Therefore, an amount of crushing of the elastic member 400 is 2 mm.

The dimensions of the gaps H between the driving frame wall portions 271 and 272 provided at a plurality of locations are not necessarily the same. The dimensions of the gaps H may be easily different due to configuration restriction or the like. In this case, a thickness of the elastic member provided with respect to the dimension of the gap H is changed to be larger. According to the experimental results of the present inventors, an amount of crushing of the elastic member is desirably 50 to 70% of the thickness of the elastic member.

The elastic member 400 is stuck to either a wall surface 271*a* of the first driving frame wall portion 271 or a wall surface 272*a* of the second driving frame wall portion 272 facing the wall surface 271*a* of the first driving frame wall portion 271 with the gap H therebetween. Here, as illustrated in FIG. 12, the elastic member 400 is stuck to the wall surface 272*a* of the second driving frame wall portion 272 with a double-sided tape (not illustrated).

The elastic member 400 is provided in the eight regions 273 where the first driving frame wall portion 271 and the second driving frame wall portion 272 facing each other with the gap H therebetween are provided. That is, in the region 273, the elastic member 400 is provided in all of the gap H between one set of the first driving frame wall portion 271 and the second driving frame wall portion 272 and the gap H between the other set of the first driving frame wall portion 271 and the second driving frame wall portion 272, which are disposed to face each other via each of the drum driving gears 222, 232*c*, 232*m*, and 232*y*. Note that the compression hardness caused by the amount of crushing of the elastic member 400 in the present embodiment does not influence the flatness of both the driving frames 201 and 202.

As a result of the above configuration, the noise reduction effect of the driving unit achieved by providing the elastic member 400 in the gap H of the wall portion will be described. In a state in which the driving unit 20 of the present embodiment is incorporated in the image forming apparatus 100, the sound pressure level (unit: dB) of the operating sound when the black drum motor 220, the color drum motor 230, the developing motor 240, and the intermediate transfer belt motor 250 are rotationally driven was measured.

For the measurement, a microphone that detects emitted sound waves and converts the sound waves into an electric signal was used. A preamplifier that amplifies an electric signal and a calculation device that calculates the amplified electric signal to a sound pressure level or a frequency are connected to the microphone. The detection surface of the microphone was disposed at a position facing the central portion on the front surface side of the image forming apparatus 100 such that a distance from the exterior surface of the image forming apparatus 100 was 1 m and a height from the floor surface was 1.5 m.

Figure 13:
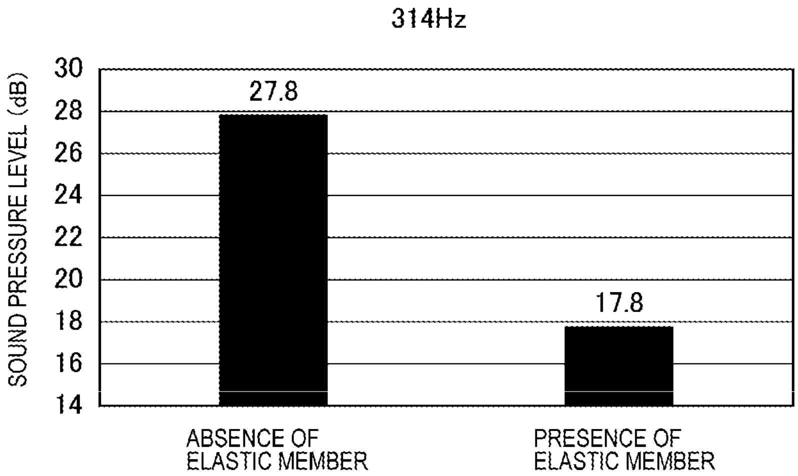
FIG. 13 is a diagram illustrating a measurement result of a noise reduction effect of the elastic member.

FIG. 13 is a diagram illustrating a measurement result of the sound pressure level of the image forming apparatus including the driving unit. FIG. 13 also illustrates results of a comparative example in which the elastic member 400 is not provided in the gap H between the wall portions 271 and 272 of the driving unit 20 (absence of elastic member) and the present embodiment in which the elastic member 400 is provided (presence of elastic member). As illustrated in FIG. 13, in the configuration of the comparative example in which the elastic member 400 is not provided in the gap H between the wall portions 271 and 272 of the driving unit 20, the sound pressure level was 27.8 dB. On the other hand, in the configuration of the present embodiment in which the elastic member 400 is provided in the gap H between the wall portions 271 and 272 of the driving unit 20, the sound pressure level was 17.8 dB. Since the elastic member 400 is provided in the gap H between the wall portions 271 and 272, the operating sound of the driving unit 20 of the present embodiment is reduced compared with the configuration in which the elastic member 400 is not provided, and a reduction effect of 10 dB is obtained at 314 Hz that is the meshing frequency of the gear.

The reason why this reduction effect was achieved is that the first driving frame 201 and the second driving frame 202 were damped by the elastic member 400 compressed and held by the first driving frame wall portion 271 and the second driving frame wall portion 272, and the vibration of both driving frames was attenuated.

Incidentally, the first driving frame 201 and the second driving frame 202 have a plurality of through-holes used for other than driving of the photosensitive drums, the developing rollers, and the intermediate transfer belt. For example, as illustrated in FIG. 11, the first driving frame 201 is provided with a positioning hole 281 that positions a jig when the driving unit 20 is assembled, and a check hole 282 used to check the presence or absence of a component such as a gear after the driving unit 20 is assembled. A gap is provided between the outer peripheral end of the first driving frame 201 and the outer peripheral end of the second driving frame 202 except for the fastening portion between the driving frames.

As a configuration of achieving a general noise reduction effect, a configuration is also conceivable in which these through-holes and gaps are shielded by another component, an elastic member, or the like to block the operating sound emitted from the inside of the driving unit 20. In contrast, the present embodiment is not configured to block all through-holes and gaps communicating with the inside of the driving unit 20 with the elastic member to perform noise reduction, but is configured to achieve the noise reduction effect by damping the frames configuring the driving unit with the elastic member.

As described above, according to the present embodiment, the gap H is provided between the first driving frame wall portion 271 and the second driving frame wall portion 272 facing each other, and the flatness of each of the driving frames 201 and 202 can be maintained. By compressing and holding the elastic member 400 with the first driving frame wall portion 271 and the second driving frame wall portion 272, it is possible to suppress vibration of the driving frames 201 and 202 and to perform noise reduction of the driving unit 20.

Note that the present invention is not limited to the configuration of the above-described embodiment, and may be configured as follows.

In the above-described embodiment, the configuration in which the present invention is applied to the driving unit in the color image forming apparatus including the photosensitive drums for four colors has been exemplified, but the present invention is not limited thereto. For example, in the driving unit 20 in a monochrome image forming apparatus including a single black photosensitive drum, the elastic member may not be provided in the wall portion corresponding to the through-hole for the color drum gear, and the elastic member may be provided only in the wall portion corresponding to the through-hole for the black drum gear. This will be specifically described with reference to FIG. 14.

Figure 14:
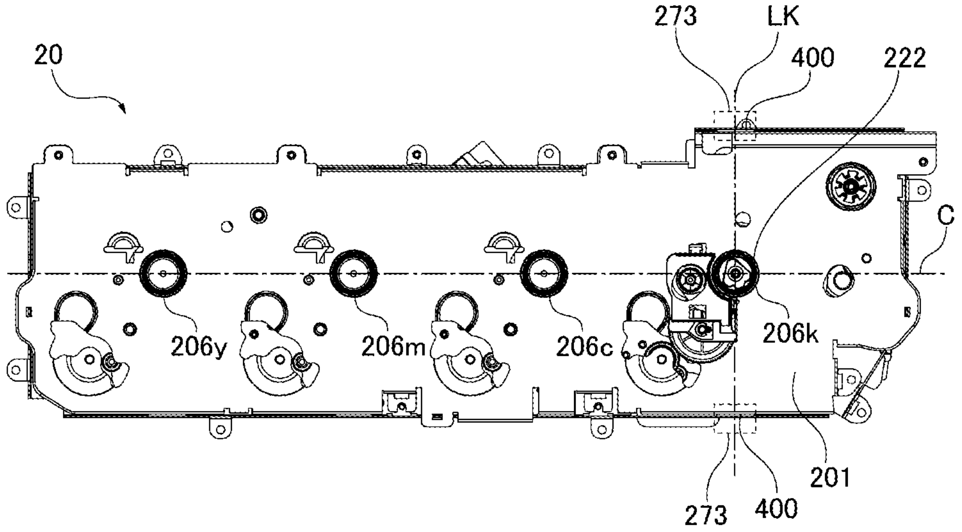
FIG. 14 is a diagram illustrating a region where an elastic member is provided in the driving unit.

In the driving unit 20 illustrated in FIG. 14, a single drum driving gear 222 is held by at least a single first through-hole 206*k* and a single second through-hole 207*k* located coaxially therewith. The elastic member 400 is compressed and held in the gap H between one set of the wall portions 271 and 272 and the gap H between another set of the wall portions 271 and 272 disposed to face each other via the single drum driving gear 222 in the region 273 including the straight line L passing through the center of the through-hole 206*k* holding the single drum driving gear 222.

Even with such a configuration, similarly to the present embodiment described above, it is possible to suppress the vibration of the driving frames 201 and 202 while maintaining the flatness of the driving frames 201 and 202, and to perform noise reduction of the driving unit 20.

In the above-described embodiment, in the driving unit of the color image forming apparatus including the four photosensitive drums, the configuration in which the elastic members 400 are provided in the eight regions that are all the gaps between the upper and lower wall portions of each drum driving gear has been exemplified, but the present invention is not limited thereto. Even if a target location where the elastic member 400 is provided is not between all the wall portions 271 and 272 of four colors, the noise reduction effect can be achieved by damping of the driving frame. For example, in a driving unit of a color image forming apparatus including four photosensitive drums, an elastic member may be provided for only one color between wall portions provided with the elastic members, or may be provided for a combination of wall portions of any color such as wall portions of yellow and cyan. In this case, although the achieved noise reduction effect is reduced compared with the case where the elastic member is provided in the wall portions of all the four colors, the noise reduction effect can be achieved compared with a case where the elastic member is not provided.

In other words, in the above-described embodiment, the configuration in which the number of target locations of the gaps between the wall portions 271 and 272 holding the elastic member 400 is equal to or larger than the number of drum driving gears held by the first driving frame and the second driving frame has been exemplified, but the present invention is not limited thereto. The number of target locations of the gaps between the wall portions 271 and 272 holding the elastic member 400 may be smaller than the number of drum driving gears held by the first driving frame and the second driving frame. Even with such a configuration, the noise reduction effect can be achieved by damping of the driving frames using the elastic member.

In the above-described embodiment, the configuration in which the driving frame wall portions 271 and 272 are provided on a part of the outer peripheries of the driving frames 201 and 202 has been exemplified, but the present invention is not limited thereto. The driving frame wall portions 271 and 272 may be provided over the entire outer peripheries of the driving frames 201 and 202. In this case, the noise reduction effect can be achieved only by the wall portions 271 and 272 in the vicinity of the drum gear through-hole corresponding to the region 273 including the above-described straight line L at the target locations of the driving frame wall portions 271 and 272 holding the elastic member 400. However, target locations of the driving frame wall portions 271 and 272 holding the elastic member 400 are not limited to only a part of the wall portions 271 and 272 such as the vicinity of the drum gear through-hole, and may be wall portions 271 and 272 on the entire peripheries of the driving frames.

Further, in the above-described embodiment, the configuration in which one pair of driving frame wall portions 271 and 272 corresponding to the drum driving gear of each color is provided in the region 273 including the straight line L has been exemplified. However, a plurality of pairs of driving frame wall portions 271 and 272 corresponding to the drum driving gear of each color may be provided in the region 273, and the elastic member may be provided in each pair of wall portions, depending on restrictions on the peripheral component shape and the like. Further, the configuration in which the pair of driving frame wall portions 271 and 272 is provided for each region 273 including the straight line L has been exemplified, but the present invention is not limited thereto. The pair of driving frame wall portions 271 and 272 may be provided as one pair to straddle two regions 273 adjacent in the left-right direction. In this case, one elastic member 400 held between the driving frame wall portions 271 and 272 may be disposed to straddle the two regions 273, or may be divided and disposed for each region 273, or may be disposed in one region 273.

Further, in the above-described embodiment, the configuration in which the driving frames 201 and 202 are made of a steel plate has been exemplified, but the present invention is not limited thereto, and the driving frames may be made of resin. In this case, the configuration of the elastic member 400 provided between the driving frame wall portions 271 and 272 is the same as that of the above-described embodiment. The configuration in which the two driving frames 201 and 202 are made of a steel plate has been exemplified, but the present invention is not limited thereto, and a combination of driving frames in which both are made of resin, or a combination of driving frames in which one is made of a steel plate and the other is made of resin may be used.

Figure 15:
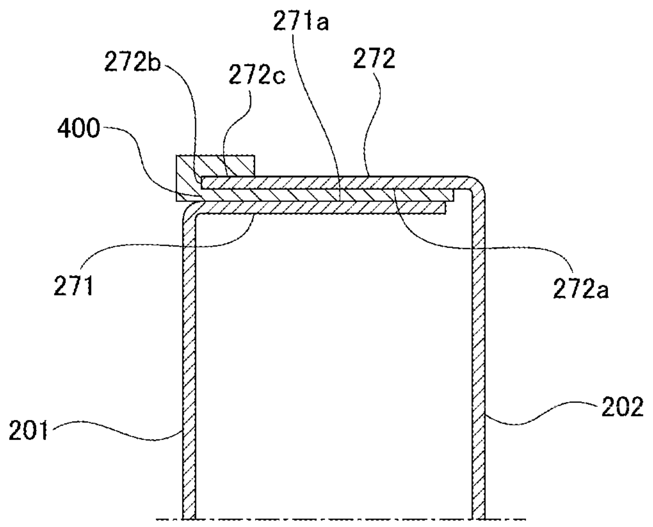
FIG. 15 is a sectional view illustrating a state in which an elastic member is folded back and provided on the driving frame wall portion.

A shape of sticking of the elastic member 400 to the driving frame wall portions 271 and 272 is not limited to the shape of sticking illustrated in FIG. 12, and is desirably the shape of sticking illustrated in FIG. 15. The elastic member 400 illustrated in FIG. 12 is stuck to one wall surface 272*a* of the driving frame wall portions 271 and 272 facing each other with a double-sided tape (not illustrated). The elastic member 400 illustrated in FIG. 15 is further folded back from the one wall surface 272*a* to a wall surface 272*c* on a side opposite to the wall surface 272*a* across a tip end 272*b* of the wall surface 272*a*, and stuck with a double-sided tape (not illustrated). With this folded shape, even if the first driving frame wall portion 271 to which the elastic member 400 is not stuck comes into contact with the elastic member 400 when both the driving frames 201 and 202 are assembled, damage such as peeling of the elastic member 400 can be prevented. Here, the configuration in which the elastic member 400 is stuck to one of the second driving frame wall portions 272 has been exemplified, but a wall portion to which the elastic member 400 is stuck may be any driving frame.

Further, in the above-described embodiment, a printer has been exemplified as the image forming apparatus, but the present invention is not limited thereto, and for example, another image forming apparatus such as a copying machine or a facsimile machine, or another image forming apparatus such as a multifunction peripheral combining these functions may be used. The image forming apparatus has been exemplified in which an intermediate transfer member is used, toner images of respective colors are transferred onto the intermediate transfer member in a sequentially superimposed manner, and the toner images borne on the intermediate transfer member are collectively transferred to a recording material, but the present invention is not limited thereto. The image forming apparatus may be an image forming apparatus that uses a recording material bearing member and transfers toner images of respective colors on a recording material borne on the recording material bearing member in a sequentially superimposed manner. Similar effects can be achieved by applying the present invention to driving units of these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-123792, filed Aug. 3, 2022, which is hereby incorporated by reference herein in its entirety.

What is claimed is:

1. An image forming apparatus comprising:

a driving unit configured to apply a driving force to a photosensitive drum, wherein the driving unit includes a driving gear having a shaft joint configured to engage with the photosensitive drum and transmit the driving force to the photosensitive drum, a first driving frame having a first through-hole configured to hold a shaft joint side of the driving gear, a second driving frame disposed opposite to the first driving frame and having a second through-hole configured to hold a side of the driving gear opposite to the shaft joint side and be located coaxially with the first through-hole, a first driving frame wall portion configured to extend in an axial direction of the driving gear from an end of a flat portion provided with the first through-hole of the first driving frame toward the second driving frame, a second driving frame wall portion configured to extend in the axial direction from an end of a flat portion of the second driving frame provided with the second through-hole toward the first driving frame and face the first driving frame wall portion with a gap therebetween in a direction orthogonal to the axial direction, and an elastic member compressed and held in the gap between the first driving frame wall portion and the second driving frame wall portion.

2. The image forming apparatus according to claim 1, wherein the first driving frame wall portion is provided in a region including at least a straight line in a second direction passing through a center of the first through-hole, the straight line being orthogonal to a straight line in a first direction passing through the center of the first through-hole, the second driving frame wall portion is provided in the region including at least the straight line in the second direction passing through the center of the first through-hole, the straight line being orthogonal to the straight line in the first direction passing through the center of the first through-hole, and is provided to face the first driving frame wall portion with a gap therebetween in the second direction orthogonal to the axial direction, and in the region including the straight line in the second direction passing through the center of the first through-hole, the elastic member having a thickness larger than a dimension of the gap is compressed and held in the gap between the first driving frame wall portion and the second driving frame wall portion.

3. The image forming apparatus according to claim 2, wherein the first driving frame includes a plurality of the first through-holes configured to respectively hold shaft joint sides of a plurality of the driving gears, the second driving frame includes a plurality of the second through-holes configured to respectively hold sides of the plurality of driving gears opposite to the shaft joint sides and be located coaxially with the respective first through-holes, the first driving frame and the second driving frame hold a single driving gear with at least one first through-hole and one second through-hole located coaxially therewith, and compress and hold the elastic member having a thickness larger than the dimension of the gap in a gap between one set of the first driving frame wall portion and the second driving frame wall portion and a gap between another set of the first driving frame wall portion and the second driving frame wall portion, which are disposed to face each other via the single driving gear in the region including the straight line in the second direction passing through the center of the first through-hole holding the single driving gear, the straight line being orthogonal to a straight line in the first direction connecting centers of a plurality of first through-holes.

4. The image forming apparatus according to claim 2, wherein the first driving frame includes a plurality of the first through-holes configured to respectively hold shaft joint sides of the plurality of driving gears, the second driving frame includes a plurality of the second through-holes configured to respectively hold sides of the plurality of driving gears opposite to the shaft joint sides and be located coaxially with the respective first through-holes, the first driving frame wall portion is provided in the region including the straight line in the second direction passing through the center of each of the first through-holes, the straight line being orthogonal to a straight line in the first direction connecting the centers of the plurality of first through-holes, the second driving frame wall portion is provided to face the first driving frame wall portion with the gap therebetween in the region including the straight line in the second direction passing through the center of each of the first through-holes, the straight line being orthogonal to the straight line in the first direction connecting the centers of the plurality of first through-holes, and the elastic member is compressed and held in at least one among gaps between the first driving frame wall portion and the second driving frame wall portion.

5. The image forming apparatus according to claim 4, wherein the first driving frame wall portion and the second driving frame wall portion are not provided between a region including the straight line in the second direction passing through the center of the first through-hole and a region including the straight line in the second direction passing through the center of the first through-hole and adjacent to the region in the first direction.

6. The image forming apparatus according to claim 1, wherein the first driving frame includes a plurality of the first through-holes configured to respectively hold shaft joint sides of a plurality of the driving gears, the second driving frame includes a plurality of the second through-holes configured to respectively hold sides of the plurality of driving gears opposite to the shaft joint sides and be located coaxially with the respective first through-holes, and the number of target locations of the gap between the first driving frame wall portion and the second driving frame wall portion provided to face the first driving frame wall portion with the gap therebetween, holding the elastic member, is smaller than the number of the driving gears held by the first driving frame and the second driving frame.

7. The image forming apparatus according to claim 1, wherein the first driving frame includes a plurality of the first through-holes configured to respectively hold shaft joint sides of the plurality of driving gears, the second driving frame includes a plurality of the second through-holes configured to respectively hold sides of the plurality of driving gears opposite to the shaft joint sides and be located coaxially with the respective first through-holes, and the number of target locations of the gap between the first driving frame wall portion and the second driving frame wall portion provided to face the first driving frame wall portion with the gap therebetween, holding the elastic member, is equal to or larger than the number of the driving gears held by the first driving frame and the second driving frame.

8. The image forming apparatus according to claim 1, wherein the first driving frame wall portion and the second driving frame wall portion that hold the elastic member and face each other with the gap therebetween are provided at a location other than a fastening portion that fastens the first driving frame and the second driving frame.

9. The image forming apparatus according to claim 1, further comprising:

a body frame; and the driving unit that is attached to the body frame and applies the driving force to the photosensitive drum, wherein the second driving frame is disposed to face the body frame via the first driving frame in the axial direction, and is attached to the body frame.

10. The image forming apparatus according to claim 1, wherein the driving unit further includes a driving source configured to apply the driving force to the driving gear, and the driving source is held by the second driving frame.

11. The image forming apparatus according to claim 1, wherein the elastic member is stuck to one of a wall surface of the first driving frame wall portion and a wall surface of the second driving frame wall portion facing the wall surface of the first driving frame wall portion with the gap therebetween.

12. The image forming apparatus according to claim 11, wherein the elastic member is folded back and stuck from the one wall surface to a wall surface on a side opposite to the wall surface across a tip end of the wall surface.

13. An image forming apparatus comprising:

a driving unit that applies a driving force to a plurality of photosensitive drums, wherein the driving unit includes:

a plurality of driving gears having shaft joints configured to be engaged with the respective photosensitive drums and transmit the driving force to the respective photosensitive drums, a first driving frame including a plurality of first through-holes configured to hold shaft joint sides of the plurality of driving gears, a second driving frame disposed opposite to the first driving frame and having a plurality of second through-holes configured to hold respective sides of the plurality of driving gears opposite to the shaft joint sides and be located coaxially with the respective first through-holes, a first driving frame wall portion configured to extend in an axial direction of the driving gears from an end of a flat portion provided with the first through-holes of the first driving frame toward the second driving frame, a second driving frame wall portion configured to extend in the axial direction from an end of a flat portion of the second driving frame provided with the second through-holes toward the first driving frame and face the first driving frame wall portion with a gap therebetween in a direction orthogonal to the axial direction, and an elastic member compressed and held in the gap between the first driving frame wall portion and the second driving frame wall portion.

14. The image forming apparatus according to claim 13, wherein the first driving frame wall portion is provided in a region including a straight line in a second direction passing through a center of each of the first through-holes configured to hold the driving gears, the straight line being orthogonal to a straight line in a first direction connecting centers of the plurality of first through-holes, and the second driving frame wall portion is provided in a region including the straight line in the second direction passing through the center of each of the first through-holes holding the driving gears, the straight line being orthogonal to the straight line in the first direction connecting the centers of the plurality of first through-holes, and is provided to face the first driving frame wall portion with a gap therebetween in the second direction orthogonal to the axial direction, and the first driving frame and the second driving frame hold the plurality of the driving gears with the plurality of first through-holes and the plurality of second through-holes located coaxially with the first through-holes, and compress and hold the elastic member having a thickness larger than a dimension of the gap in a gap between one set of the first driving frame wall portion and the second driving frame wall portion and a gap between the other set of the first driving frame wall portion and the second driving frame wall portion, which are disposed to face each other via each driving gear in the region including the straight line in the second direction passing through the center of the first through-hole holding each driving gear.

* * * * *